United States Patent Office 3,392,133
Patented July 9, 1968

3,392,133
ANTIFOGGING COATINGS FOR ALKENYL
AROMATIC RESINOUS SUBSTRATES
Jerome H. Stickelmeyer, Midland, Mich., assignor to The
Dow Chemical Company, Midland, Mich., a corporation of Delaware
No Drawing. Filed Aug. 22, 1962, Ser. No. 218,533
10 Claims. (Cl. 260—29.6)

This invention relates to an improved alkenyl aromatic resinous shaped article. It more particularly relates to an improved alkenyl aromatic shaped article such as film or sheet having a coating thereon which imparts antifogging and good slip characteristics thereto.

The invention is particularly adapted to be practiced with integral solid thermoplastic styrene polymer film or sheets. Such a polymer is employed herein as being generally representative of alkenyl aromatic compounds of the type that contain at least about 50 weight percent of at least one polymerized alkenyl aromatic compound or monomer having the general formula: $Ar\!-\!CR\!=\!CH_2$, wherein "R" is hydrogen or methyl and "Ar" is a hydrocarbon aromatic radical, advantageously of the benzene series, of from 6 to 10 carbon atoms (including the carbon atoms in any ring substituents on the aromatic nucleus). Thermoplastic polymers and copolymers of styrene and polymers and copolymers of $\alpha$-methyl styrene, ar-methyl styrene (or vinyl toluene), ar-dimethyl styrenes, and graft copolymers with other polymeric substances (such as elastomeric polymers) may frequently be utilized with benefits commensurate or in excess of those which are derivable from employment of polystyrene alone.

Such alkenyl aromatic resinous sheets and similar shaped articles, when utilized for purposes such as packaging and overwraps, particularly those involving the packaging of moisture-containing goods, it is desirable that such moisture, when it condenses on the surface of the film, should not form individual droplets. Formation of such individual droplets renders the sheet unsightly, particularly in cases where the overwrapping resinous sheet is transparent, and this can also result in rendering the film opaque. When transparent windows are utilized for display purposes, this moisture condensation can substantially totally eliminate their value. A number of coating formulations and treatments have been developed for alkenyl aromatic resinous shaped articles to eliminate fogging. Unfortunately, usually such coatings generally have not provided satisfactory slip characteristics. By "slip characteristics" is meant the relative ease with which contiguous surfaces may be moved over one another. For example, a coated sheet has good slip characteristics if it may be withdrawn from a stack of like sheets by sliding it from a stack of like sheets. It is also particularly beneficial if such a coating has antifog and slip characteristics and the property of heat-sealing to itself without severe distortion and shrinking, particularly when oriented resinous sheet or film is utilized.

It is an object of this invention to provide an improved method of treating an alkenyl aromatic resinous shaped article to provide an antifogging coating having good slip characteristics.

It is another object of this invention to provide an improved heat-sealable, alkenyl aromatic resinous film having an antifogging coating thereon and having good slip characteristics.

It is a further object of this invention to provide an improved antifogging coating on an alkenyl aromatic resinous film which will withstand prolonged contact with moisture and have good slip characteristics.

These benefits and other advantages in accordance with the invention are readily achieved by providing an alkenyl aromatic resinous shaped article having a coating on at least one of its surfaces, said coating comprising (a) a compound of the formula:

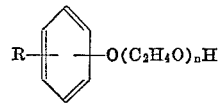

wherein "R" represents an alkyl radical containing from 8 to 12 carbon atoms and "n" is an integer from about 9 to about 30 with the further limitations that "n" is not less than the number of carbon atoms in the alkyl group, and (b) an aqueous dispersion of an alkenyl aromatic resin.

Also contemplated within the scope of the invention is a coating composition for the treatment of surfaces of alkenyl aromatic resinous shaped articles comprising a mixture of (a) a compound of the formula:

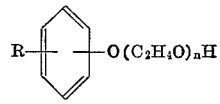

wherein "R" represents an alkyl radical containing from 8 to 12 carbon atoms with "n" as an integer from about 9 to about 30 with the further limitation that "n" is at least equal to the number of carbon atoms in the alkyl group, and (b) an aqueous dispersion of an alkenyl aromatic resin in a vehicle which is substantially nonreactive with and non-solvent for the alkenyl aromatic resinous substrate or the coating components, sufficient to deposit from about .5 to about 10 milligrams of dry coating per square foot of the treated film, and subsequently removing the vehicle from the coating.

Advantageously, coating weights of from about 0.9 to about 3 milligrams per square foot of the coated surface of the alkenyl aromatic resinous shaped article are utilized. Coating weights heavier than about 10 milligrams per square foot generally provide no added benefits, and below about one-half milligram per square foot the desired heat-sealing and antifog characteristics are markedly reduced.

The alkylphenyl polyethylene glycol ethers employed in the practice of the present invention are water-soluble and are readily water-dispersible, and when deposited on the surface of the film provide the antifogging characteristics. The polyethylene glycol function of the molecule includes from about 8 to about 30 oxyethylene groups. When less than 8 oxyethylene groups are utilized in the molecule, frequently insufficient antifogging characteristics are evident. Oxyethylene groups in excess of about 30 tend to give the product poorer than desired heat-sealing characteristics. In cases where the number of oxyethylene group is lower than the number of carbon atoms in the alkyl group the desired characteristics are not obtained. Advantageously, for most applications from 10–25 oxyethylene units are utilized in the molecule.

The alkenyl aromatic resinous latex polymers are similar to or identical to those hereinbefore defined for use as a substrate, with the exception that at least 75 weight percent of the polymer is a polymerized alkenyl aromatic monomer having the general formula: $Ar\!-\!CR\!=\!CH_2$, wherein "R" is hydrogen or methyl and "Ar" is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of $\alpha$-methyl styrene, ar-methyl styrene (or vinyl toluene), the several mono- and di-chlorostyrenes and ar-dimethyl styrenes, including copolymers thereof with such materials as acrylonitrile, butadiene and the like and graft copolymers with other polymeric substances (such as other elastomeric polymers) may frequently be utilized with benefits commensurate with or in excess of those which are derivable from employment of polystyrene alone.

Generally, in the preparation of coated compositions in accordance with the invention, the alkylphenyl polyethylene glycol ether is dispersed or dissolved in a suitable quantity of an inert solvent such as water. Such solutions or dispersions are readily prepared by admixture or standing. Frequently, heating will serve to accelerate the solution or dispersion process. A suitable quantity of the alkylphenyl polyethylene glycol solution is then added to a suitably diluted dispersion of an alkenyl aromatic resin and thoroughly admixed and the composition is ready for use. Beneficially, the two components are admixed in a ratio of from about 1:100 to about 10:1 of alkylphenyl polyoxyethylene ether to latex solids. Antifogging characteristics and improved slip are obtained within this range. In cases where maximum antifogging and slip characteristics are desired, a particularly advantageous proportion is about 1:100 to about 1:30 of alkylphenyl polyoxyethylene ether to latex solids. In cases wherein it is desired to provide a combination of antifogging and slip characteristics together with the ability to heat-seal the surface of the coated article such as sheets or films together, a beneficial ratio is from about 5:1 to about 1:15 of the phenyl oxyalkylene ether to the latex solids. Most advantageously, this combination of characteristics is attained when a ratio of about 3:1 to 1:3 is utilized.

The ingredients of the anti-fogging composition are conveniently mixed with one another by dispersing them in a liquid medium such as water, lower aliphatic alcohols or a mixture of water and a lower alkyl alcohol such as methanol, ethanol, isopropanol, n-propanol or tert.-butyl alcohol, which liquid medium is a non-solvent for the alkenyl aromatic substrate or latex polymer. It is relatively difficult to meter accurately extremely thin coatings of a liquid onto a solid surface. Therefore, usually a relatively low proportion of the coating materials are dispersed in an inert solvent or carrier. Beneficially, dispersions containing from $\frac{1}{10}$ of 1 percent to 5 percent of the alkyl phenyl polyglycol ether are utilized and, particularly advantageous, are concentrations in the range of from about 0.5 percent to about 2 percent. The coating composition is readily applied to the alkenyl aromatic resinous articles by spraying, dipping, rolling, brushing, and like methods. In cases where water dispersions of the coating compositions are employed, the concentration of the alkyl phenyl polyglycol ether must be sufficiently high to permit even wetting of the substrate. Beneficially, the surfaces of alkenyl aromatic articles are made more susceptible to wetting by treatment with corona discharge, ozone, sulphonation and like techniques well known in the art.

The wet coatings freshly applied, beneficially are dried by exposure to infrared or contact heat to provide a uniform, thin, clear, adherent, heat-sealable coating on the surface of the alkenyl aromatic resinous article. The temperature of the wet coating during the drying operation should be preferably maintained at a temperature lower than the boiling point of the inert vehicle and, preferably, lower than the temperature at which the alkenyl aromatic resinous substrate will deform.

The following examples serve to illustrate the invention, but are not to be construed as limiting thereto:

Example I

A biaxially oriented polystyrene sheet of about 1 mil thickness was coated on both sides with a solution containing ½ of 1 percent of a nonylphenyl polyethylene glycol having 15 polyethylene glycol units and containing ½ of 1 percent by weight of latex solids. The solids were a copolymer of 80 parts styrene and 20 parts butadiene. The coating composition was dried in an air oven at about 80° C. for about 1 minute and deposited a dry coating weighing about 2 milligrams per square foot of coated surface. The coated film exhibited excellent clarity and slip. It was evaluated for antifogging characteristics by securing the film, coated side down, with a rubber band over the top of a 32 ounce glass jar containing about 6 ounces of water at 25° C. The jar was placed in a refrigerator for 2 minutes, then examined for fogging. The coated film remained clear and transparent after prolonged exposure to the foregoing conditions. Samples were found to withstand 30 minutes without any apparent loss of antifogging characteristics.

Several samples of the coated film were heat-sealed in a heat-sealing apparatus having smooth jaws. The jaws were maintained at a temperature of about 80° C. and were sealed utilizing a dwell time of about 1½ seconds at a pressure of about 1 pound per square inch. The resultant seal was tested by peeling the sealed film portions apart in a tensile testing machine. The seals consistently exhibited strengths greater than about 100 grams per inch.

Example II

The procedure of Example I was repeated with the exception that the ratio of the polyglycol ether to latex solids was 5:1 and a total solids concentration of 1 percent was maintained. Evaluation of the coated product indicated that commensurate antifog and heat-sealing properties were attained and the film had good slip characteristics.

Example III

The procedure of Example I was repeated with the exception that the ratio of the polyglycol ether to latex solids was 1:5 and a total solids concentration of 3 percent was maintained. Evaluation of the coated product indicated that commensurate antifog and heat-sealing properties were attained and the film had excellent slip characteristics.

Example IV

The procedure of Example I was followed with the exception that the alkylphenyl polyglycol ether contained 8 carbon atoms in the alkyl group and 20 ethylene oxide units in the polyglycol portion. Commensurate antifog and heat-sealing properties were obtained and the film had good slip characteristics.

Example V

The procedure of Example I was repeated with the exception that the alkylphenyl polyglycol ether contained 12 carbon atoms in the alkyl group and 12 ethylene oxide units in the polyethylene glycol portion. Commensurate antifog, heat-sealing and slip properties were obtained.

Example VI

The procedure of Example I was repeated with the exception that the styrene-butadiene latex was replaced with a polystyrene latex. Commensurate antifog, slip and heat-sealing results were obtained.

Example VII

The procedure of Example I was repeated with the exception that the styrene-butadiene latex was replaced by a latex prepared from 75 parts styrene and 25 parts ethylacrylate. Similar antifog, heat-sealing and slip characteristics were obtained.

Example VIII

The procedure of Example I was repeated with the exception that the styrene-butadiene latex was replaced with a vinyl toluene latex. Commensurate antifog, slip and heat-sealing characteristics were obtained.

Example IX

The procedure of Example I was repeated with the exception that the styrene-butadiene latex was replaced with a copolymer latex prepared by polymerizing 90 parts of polystyrene with 10 parts α-methyl styrene. Commensurate antifog, slip and heat-sealing results were obtained.

Example X

The procedure of Example I was repeated with the exception that an octyl phenyl polyglycol having 9 polyethylene glycol units was employed in place of the nonyl phenyl glycol. Very good antifog, slip and heat-seal properties were obtained.

Example XI

The procedure of Example I was repeated with the exception that a dodecylphenyl polyethylene glycol having 30 polyethylene glycol units was utilized instead of the nonyl phenyl glycol. The heat-sealing, antifog and slip characteristics were very good.

In a manner similar to the foregoing examples, other alkenyl aromatic resinous shaped articles are readily prepared having excellent heat-sealing and antifogging properties with such substrates as copolymers of styrene and methyl methacrylate, such as those containing 80 parts polystyrene and 20 parts methyl methacrylate, and like substrates.

As is apparent from the foregoing specification, the method and article of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted is being restrictive or otherwise limiting of the present invention, excepting as it is set forth and defined in the hereto appended claims.

What is claimed is:

1. A heat-sealable and antifogging alkenyl aromatic resinous shaped article having a coating on at least one of its surfaces, said coating comprising (a) a compound of formula

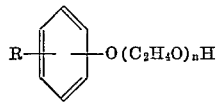

wherein R is an alkyl radical containing from 8 to 12 carbon atoms and $n$ is an integer of from about 9 to about 30, with the further limitation that $n$ is at least equal to the number of carbon atoms in the alkyl group, (b) is an aqueous dispersion of an alkenyl aromatic resin containing at least 75 weight percent of an alkenyl aromatic monomer polymerized with up to 25 percent of another material polymerizable therewith, said components (a) and (b) being of the proportion from about 1:15 to about 5:1.

2. The article of claim 1, wherein said article is a film.
3. The article of claim 2, wherein said film is polystyrene.
4. The article of claim 3, wherein said film is an oriented polystyrene film.
5. The article of claim 1, wherein said coating comprises about 2 parts of (a) and 1 part of (b).
6. The article of claim 5, wherein R contains 9 carbon atoms and $n$ is about 15.
7. The article of claim 6, wherein said alkenyl aromatic resin in dispersion contains about 80 percent styrene and 20 percent butadiene polymerized therein.
8. The article of claim 1, wherein said coating weighs about ½ to about 10 milligrams per square foot of surface of the alkenyl aromatic resinous shaped article.
9. The article of claim 8, wherein the coating weight is from about 0.9 to about 3 milligrams per square foot.
10. A coating composition comprising a mixture of (a) a compound of the formula

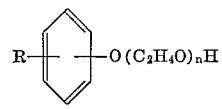

wherein R represents an alkyl radical containing from 8 to 12 carbon atoms and $n$ is an integer from about 9 to about 25, and (b) an aqueous dispersion of an alkenyl aromatic resin containing at least 75 percent by weight of an alkenyl aromatic resinous monomer polymerized with up to 25 percent of another material polymerizable therewith in an aqueous vehicle which is substantially non-reactive with and non-solvent for an alkenyl aromatic resinous material, the components (a) plus (b) being present in a ratio of from about 3:1 to 1:3 based on the dry weight of said components and the dry weight of the components (a) and (b) comprises from about 0.1 to about 3 percent of the total weight of the composition.

References Cited

UNITED STATES PATENTS

| | | | |
|---|---|---|---|
| 2,748,027 | 5/1956 | Meier | 260—29.6 |
| 2,760,884 | 8/1956 | Graf | 260—29.6 |
| 3,022,178 | 2/1962 | Park et al. | 117—138.8 |

SAMUEL H. BLECH, *Primary Examiner.*

LEON J. BERCOVITZ, M. TILLMAN, *Examiners.*

E. B. WOODRUFF, J. L. WHITE, *Assistant Examiners.*